(12) United States Patent
Aizawa

(10) Patent No.: US 9,575,168 B2
(45) Date of Patent: Feb. 21, 2017

(54) RADAR APPARATUS

(75) Inventor: Ichiro Aizawa, Sunto-gun (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 679 days.

(21) Appl. No.: 13/811,421

(22) PCT Filed: Aug. 18, 2010

(86) PCT No.: PCT/JP2010/063940
§ 371 (c)(1),
(2), (4) Date: Jan. 22, 2013

(87) PCT Pub. No.: WO2012/023189
PCT Pub. Date: Feb. 23, 2012

(65) Prior Publication Data
US 2013/0120184 A1 May 16, 2013

(51) Int. Cl.
*G01S 13/93* (2006.01)
*G01S 13/42* (2006.01)
*G01S 7/35* (2006.01)

(52) U.S. Cl.
CPC ............ *G01S 13/42* (2013.01); *G01S 13/931* (2013.01); *G01S 2007/356* (2013.01); *G01S 2013/9321* (2013.01); *G01S 2013/9325* (2013.01)

(58) Field of Classification Search
CPC ....... G01S 13/931; G01S 13/584; G01S 13/42
USPC .................................................... 342/70, 133
See application file for complete search history.

(56) References Cited

U.S. PATENT DOCUMENTS

| 6,249,243 | B1 * | 6/2001 | Takagi | G01S 7/352 342/108 |
| 6,380,884 | B1 * | 4/2002 | Satou | G01S 13/42 342/147 |
| 6,741,204 | B2 | 5/2004 | Kumon et al. | |
| 8,446,312 | B2 * | 5/2013 | Kanamoto | G01S 3/74 342/147 |

(Continued)

FOREIGN PATENT DOCUMENTS

| JP | 2000 180540 | 6/2000 |
| JP | 2000 206241 | 7/2000 |

(Continued)

OTHER PUBLICATIONS

International Search Report Issued Sep. 21, 2010 in PCT/JP10/063940 Filed Aug. 18, 2010.

*Primary Examiner* — Marcus Windrich
(74) *Attorney, Agent, or Firm* — Oblon, McClelland, Maier & Neustadt, L.L.P.

(57) ABSTRACT

A radar apparatus is disclosed which includes: a distance detecting part configured to detect, among plural bins, an existence distance bin in which the target object exists, a direction detecting process executing part configured to execute a process of detecting a direction in which the target object exists, with respect to a distance bin other than the existence distance bin detected by the distance detecting part, among plural bins from which relative distances to the target object can be calculated, if a predetermined criterion is met; an existence area detecting part configured to detect, based on an execution result of the direction detecting process executing part, an area in which the target object exists.

8 Claims, 8 Drawing Sheets

(56) References Cited

U.S. PATENT DOCUMENTS

| | | | | |
|---|---|---|---|---|
| 8,552,907 | B2* | 10/2013 | Kanamoto | G01S 3/74 342/147 |
| 8,581,777 | B2* | 11/2013 | Kanamoto | G01S 3/74 342/118 |
| 8,779,969 | B2* | 7/2014 | Shimizu | G01S 7/412 342/106 |
| 8,847,815 | B2* | 9/2014 | Kanamoto | G01S 3/74 342/118 |
| 2005/0035902 | A1 | 2/2005 | Eder et al. | |
| 2010/0033365 | A1* | 2/2010 | Kishida | G01S 13/42 342/70 |
| 2010/0207806 | A1 | 8/2010 | Takahashi et al. | |
| 2010/0271254 | A1* | 10/2010 | Kanamoto | G01S 3/74 342/27 |
| 2011/0309971 | A1* | 12/2011 | Kanamoto | G01S 3/74 342/147 |

FOREIGN PATENT DOCUMENTS

| | | |
|---|---|---|
| JP | 2003 270341 | 9/2003 |
| JP | 2004 205211 | 7/2004 |
| JP | 2009 31165 | 2/2009 |

* cited by examiner

RADAR APPARATUS

TECHNICAL FIELD

The present invention is related to a radar apparatus. In particular, the present invention is related to a radar apparatus suited for detecting a target object by transmitting a radio wave and receiving a reflected wave of the transmitted radio wave generated by the reflection on the target object.

BACKGROUND ART

A radar apparatus is known which detects the target object by transmitting the radio wave in the forward direction of the vehicle and receiving the reflected wave of the transmitted radio wave generated by the reflection on the target object, and the detection result is used for preventing a collision with the target object such as a preceding vehicle, a oncoming vehicle, a wall, etc., or controlling the distance between the host vehicle and the preceding vehicle (see Patent Document 1, for example). According to the disclosed radar apparatus, reflection points are detected in plural directions. The reflection points, which are estimated to belong to the same target object, are classified into the same group. The lines defining the area of the target object are extracted based on an arrangement of the reflection points of the group. Therefore, according to the radar apparatus, the area of the target object can be detected.

[Patent Document 1] Japanese Laid-open Patent Publication No. 2000-206241

DISCLOSURE OF INVENTION

Problem to be Solved by Invention

The disclosed radar apparatus includes plural antennas whose reception directions of the radio wave are slightly shifted from each other, and detects the reflection points based on the reception strength level of the reflected wave received by the respective antennas to detect the outline of the target object. Specifically, at each antenna the signal whose reception strength level is low is removed as an unwanted signal, and the reflection point is detected based on the signal whose reception strength level is the maximum. The area of the target object is detected based on the reflection points at the respective antennas.

In general, although the radio wave transmitted from the transmitting part has a beam width to some degree, the reflection strength of the radio wave may vary depending on the status of the reflection surface of the target object, etc. For this reason, if the reflection points are detected from the signals whose reception strength levels are the maximum at the respective antennas, there may be risk that the detection accuracy of the reflection points is reduced and the area of the target object cannot be detected with high accuracy. Further, if the target object is such an object which exits in a spatially continued manner such as the wall, the curb or the like, the peaks of the reception strength level at the respective antennas cannot be detected easily. For this reason, if the reflection points are detected from the signals whose reception strength levels are the maximum at the respective antennas, there may be risk that the reflection points cannot be detected and the target object cannot be detected constantly.

The present invention is made in consideration of the context described above, and an object of the present invention is to provide a radar apparatus which is capable of detecting the area in which the target object exists with high accuracy.

Means to Solve the Problem

The object is achieved by a radar apparatus which includes a transmitting part configured to transmit a radio wave and receiving parts configured to receive a reflected wave of the radio wave transmitted from the transmitting part, and detects a target object based on the reflected wave received by the receiving parts, comprising: a distance detecting part configured to detect, among plural bins, an existence distance bin in which the target object exists, a direction detecting process executing part configured to execute a process of detecting a direction in which the target object exists, with respect to a distance bin other than the existence distance bin detected by the distance detecting part, among plural bins from which relative distances to the target object can be calculated, if a predetermined criterion is met; an existence area detecting part configured to detect, based on an execution result of the direction detecting process executing part, an area in which the target object exists.

According to this aspect of the invention, if the predetermined criterion is met, the process of detecting a direction in which the target object exists is performed with respect to a distance bin other than the existence distance bin in which the target object exists, among plural bins. Therefore, even if the reflection strength of the radio wave varies according to the position in the reflection surface of the target object or the target object exists in a spatially continued manner, plural reflection points of the target object defined by the distances and the directions can be identified and thus the area in which the target object exists can be detected with high accuracy.

The radar apparatus may be configured such that it further comprises an angle detecting part configured to detect a direction in which the target object exists, with respect to the existence distance bin detected by the distance detecting part, wherein the direction detecting process executing part executes the process of detecting the direction in which the target object exists, with respect to an adjacent distance bin located near the existence distance bin, among the bins, if it is determined by the distance detecting part as the predetermined criterion that there is the existence distance bin, and the existence area detecting part detects, based on a calculation result of the angle detecting part and the execution result of the direction detecting process executing part, the area in which the target object exists.

According to this aspect of the invention, if it is determined that there is the existence distance bin, the process of detecting a direction in which the target object exists is performed with respect to a distance bin other than the existence distance bin in which the target object exists, among plural bins. Therefore, even if the reflection strength of the radio wave varies according to the position in the reflection surface of the target object, plural reflection points of the target object defined by the distances and the directions can be identified and thus the area in which the target object exists can be detected with high accuracy.

Further, the radar apparatus may be configured such that the distance detecting part determines that there is the existence distance bin if there is a peak of a signal strength of the reflected wave received by the receiving parts, the signal strength being obtained on a distance bin basis, while the distance detecting part determines that there is not the existence distance bin if there is not the peak of the signal strength of the reflected wave received by the receiving parts.

Further, the radar apparatus may be configured such that the angle detecting part detects the area in which the target object exists based on amplitudes and phases obtained in plural channels, with respect to the existence distance bin at which there is the peak of the signal strength of the reflected wave received by the receiving parts.

Further, the radar apparatus may be configured such that the angle detecting part detects an angle at which a peak of a signal strength of the reflected wave received by the receiving parts appears, as the direction in which the target object exists, the signal strength being obtained on an angle basis with respect to the existence distance bin.

Further, the radar apparatus may be configured such that the direction detecting process executing part executes the process of detecting the direction in which the target object exists, based on amplitudes and phases obtained in plural channels, with respect to respective adjacent distance bins located near the existence distance bin, among the bins, if it is determined by the distance detecting part as the predetermined criterion that there is the existence distance bin.

Further, the radar apparatus may be configured such that the direction detecting process executing part executes the process of detecting the direction in which the target object exists, with respect to a predetermined distance bin, among the bins, if it is determined as the predetermined criterion that the bins don't include the existence distance bin.

According to this aspect of the invention, if it is determined that there is not the existence distance bin, the process of detecting a direction in which the target object exists is performed with respect to a predetermined distance bin among plural bins. Therefore, even if the target object exists in a spatially continued manner, plural reflection points of the target object defined by the distances and the directions can be identified and thus the area in which the target object exists can be detected with high accuracy.

Further, the radar apparatus may be configured such that the direction detecting process executing part executes the process of detecting the direction in which the target object exists, based on amplitudes and phases obtained in plural channels, with respect to plural predetermined distance bins, among the bins, if it is determined as the predetermined criterion that the bins don't include the existence distance bin.

Further, the radar apparatus may be configured such that the direction detecting process executing part detects an angle at which a peak of a signal strength of the reflected wave received by the receiving parts appears, as the direction in which the target object exists, the signal strength being obtained on an angle basis with respect to the respective adjacent distance bins or the respective predetermined distance bins.

Advantage of the Invention

According to the present invention, the area in which the target object exists can be detected with high accuracy.

DESCRIPTION OF REFERENCE SYMBOLS 20, 100 radar apparatus
22 transmission antenna
24 reception antenna
32, 102 signal processor

BEST MODE FOR CARRYING OUT THE INVENTION

In the following, concrete embodiments according the present invention will be described in detail by referring to the accompanying drawings.

First Embodiment

Figure 1:
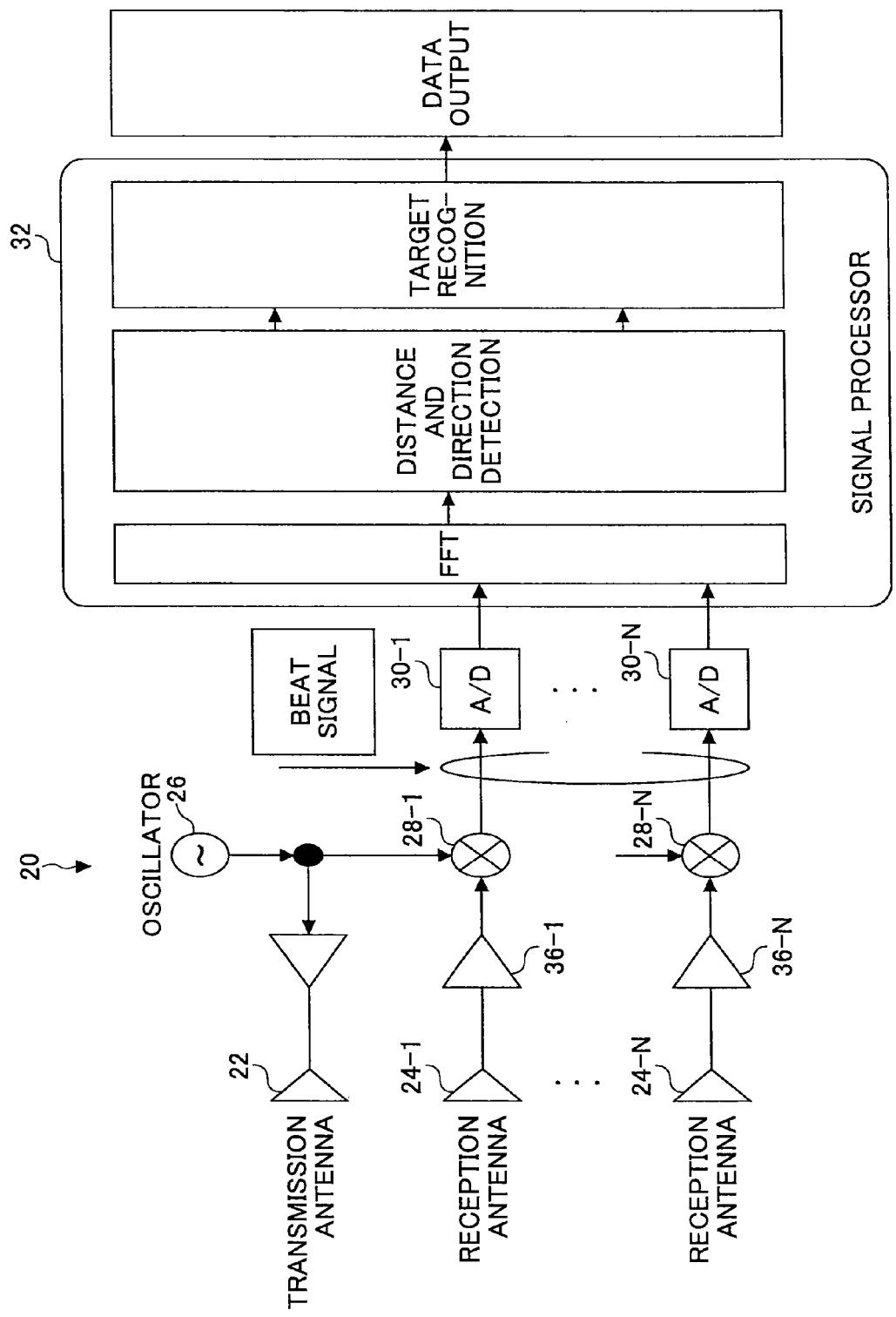
FIG. 1 is a diagram for illustrating a configuration of a radar apparatus according a first embodiment of the present invention.

FIG. 1 is a diagram for illustrating a configuration of a radar apparatus 20 according a first embodiment of the present invention. The radar apparatus 20 is mounted on a mobile object such as a vehicle, a flying object or the like or a fixed object. The radar apparatus 20 is of FM-CW type, for example, for detecting a target object existing nearby. As illustrated in FIG. 1, the radar apparatus 20 according to the embodiment includes a transmission antenna 22, a reception antenna 24, an oscillator 26, a mixer 28, an A/D converter 30 and a signal processor 32. It is noted that it is assumed that the radar apparatus 20 is mounted on the vehicle and data of the target object detected by the radar apparatus 20 is provided to and used by an application apparatus such as an inter-vehicle distance controller, a speed controller, a brake controller, etc., mounted on the vehicle.

The oscillator 26 outputs the oscillation signal whose frequency varies with time. The oscillator 26 is connected to the transmission antenna 22 via an amplifier 34. The transmission antenna 22 emits a transmission wave of the electromagnetic wave, for example a millimeter wave, whose frequency varies with time to the outside space in response to the oscillation signal transmitted from the oscillator 26. The transmission antenna 22 emits the radio wave toward a traveling direction of the vehicle in a predetermined detection region.

The reception antenna 24 includes plural reception antennas (N reception antennas). The respective reception antennas 24-1 through 24-N are connected to mixers 28-1 through 28-N via amplifiers 36-1 through 36-N. Reception waves received by the respective reception antennas 24-1 through 24-N are inputted to the mixers 28-1 through 28-N via the amplifiers 36-1 through 36-N. The greater the reception strengths at the reception antennas 24-1 through 24-N become, the greater the amplitudes of the reception signals input to the mixers 28-1 through 28-N become. The oscillation signal from the oscillator 26 is input to the mixers 28-1 through 28-N. The mixers 28-1 through 28-N mix the corresponding reception signals and the oscillation signal to generate beat signals which have the beat frequencies of both signals, respectively.

The mixers 28-1 through 28-N are connected to A/D converters 30-1 through 30-N. The beat signals generated by the mixers 28-1 through 28-N are inputted to the A/D converters 30-1 through 30-N. The A/D converters 30-1 through 30-N convert the beat signals into digital signals, respectively, and provide the digital signals to the signal processor 32.

The signal processor 32 performs fast-Fourier-transform (FFT) processing, etc., on the input digital signals to extract the frequency components (amplitudes and phases) according to the target object based on input digital signals and detect, based on the extracted frequency components, a distance from the host vehicle to the target object, a relative speed of the host vehicle with respect to the target object and a direction (angle) of the target object with respect to the host vehicle. Then, the signal processor 32 recognizes the detected target object and outputs data signals according to the recognition result to the application apparatus.

Next, with reference to FIG. 2 through FIG. 5, a method of detecting the target object in the radar apparatus 20 according to the embodiment is described.

Figure 2:
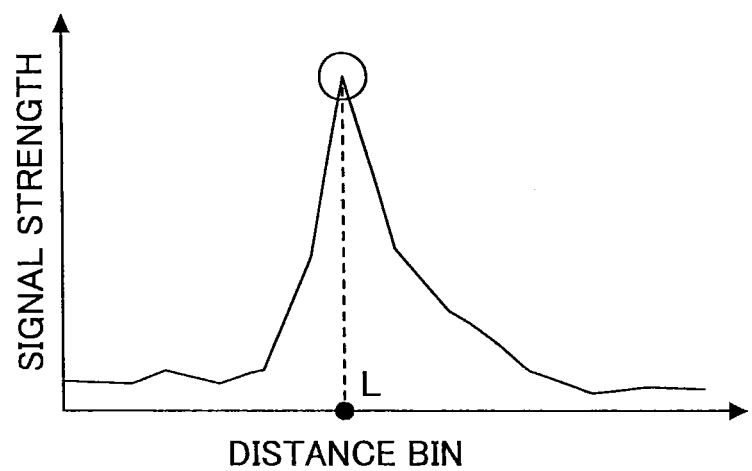
FIG. 2 is a diagram for illustrating the reception result of a reception antenna (the reception signal strength with respect to the distance bin) in the case where a target object exists a predetermined distance L away from the vehicle.
Figure 3:
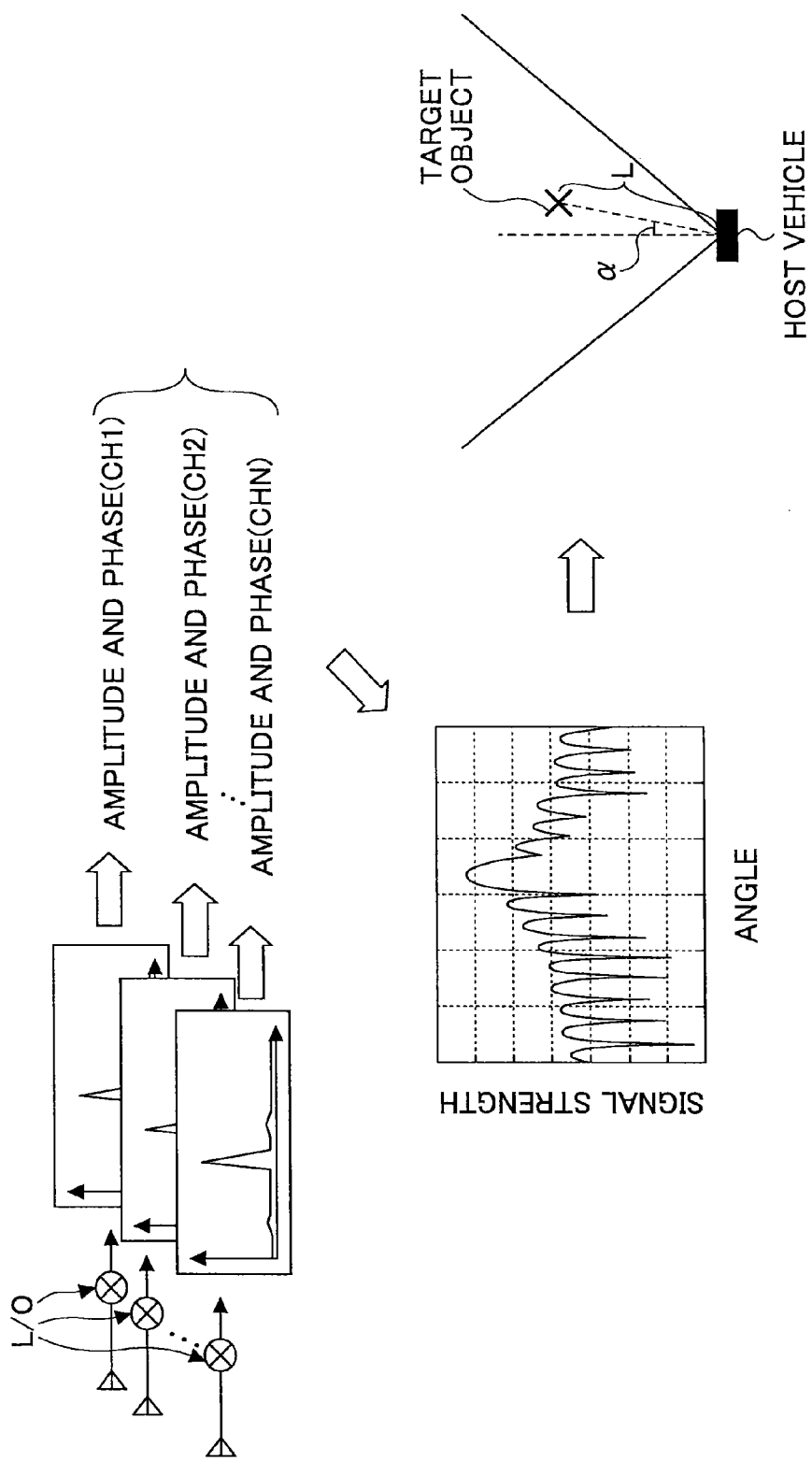
FIG. 3 is a diagram for explaining a way of detecting a direction of the target object based on the reception results of plural reception antennas.
Figure 4:
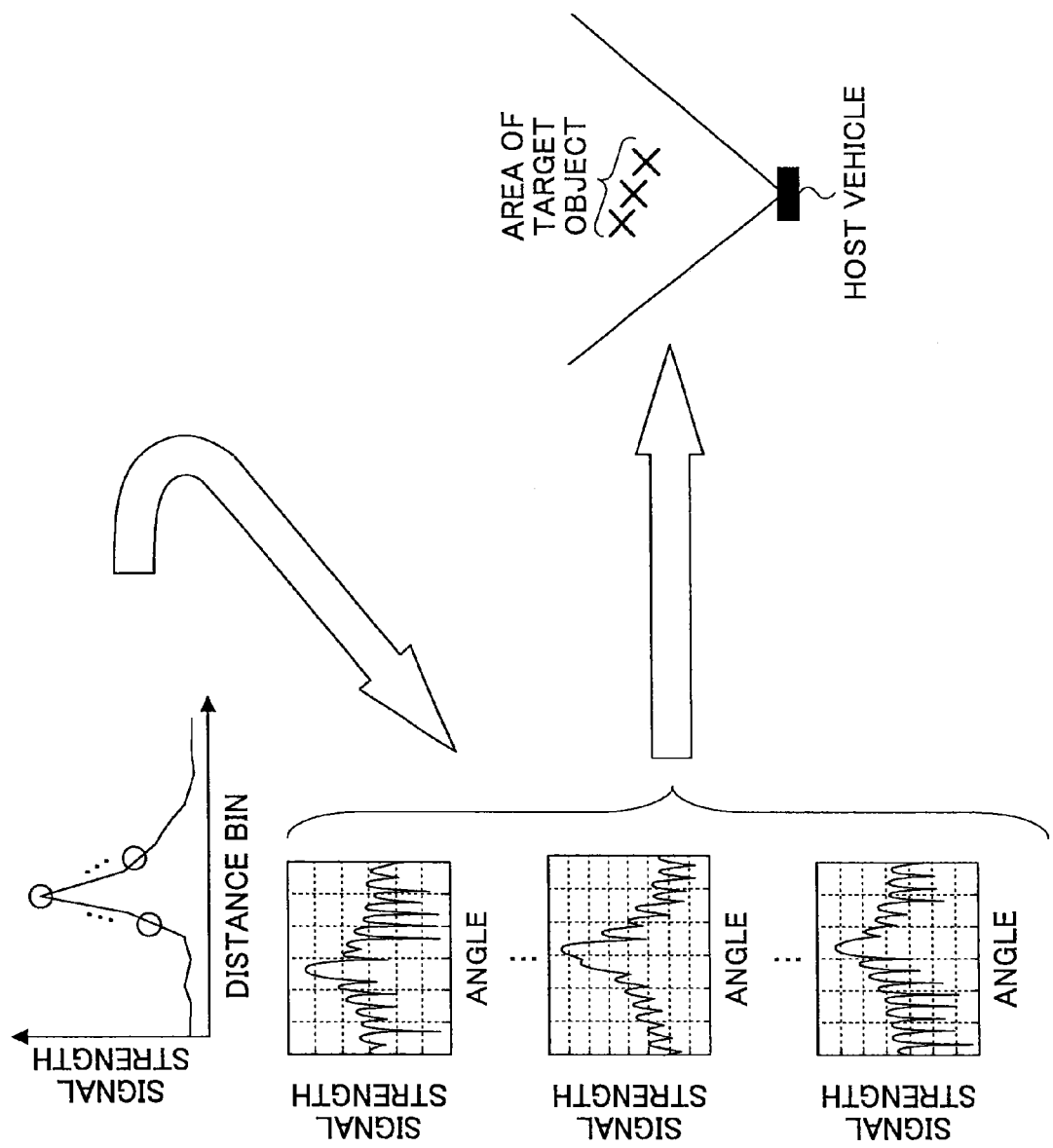
FIG. 4 is a diagram for explaining a way of detecting a direction of the target object based on the reception results of the respective reception antennas with respect to plural distance bins including an existence distance bin in the radar apparatus according to the embodiment.
Figure 5:
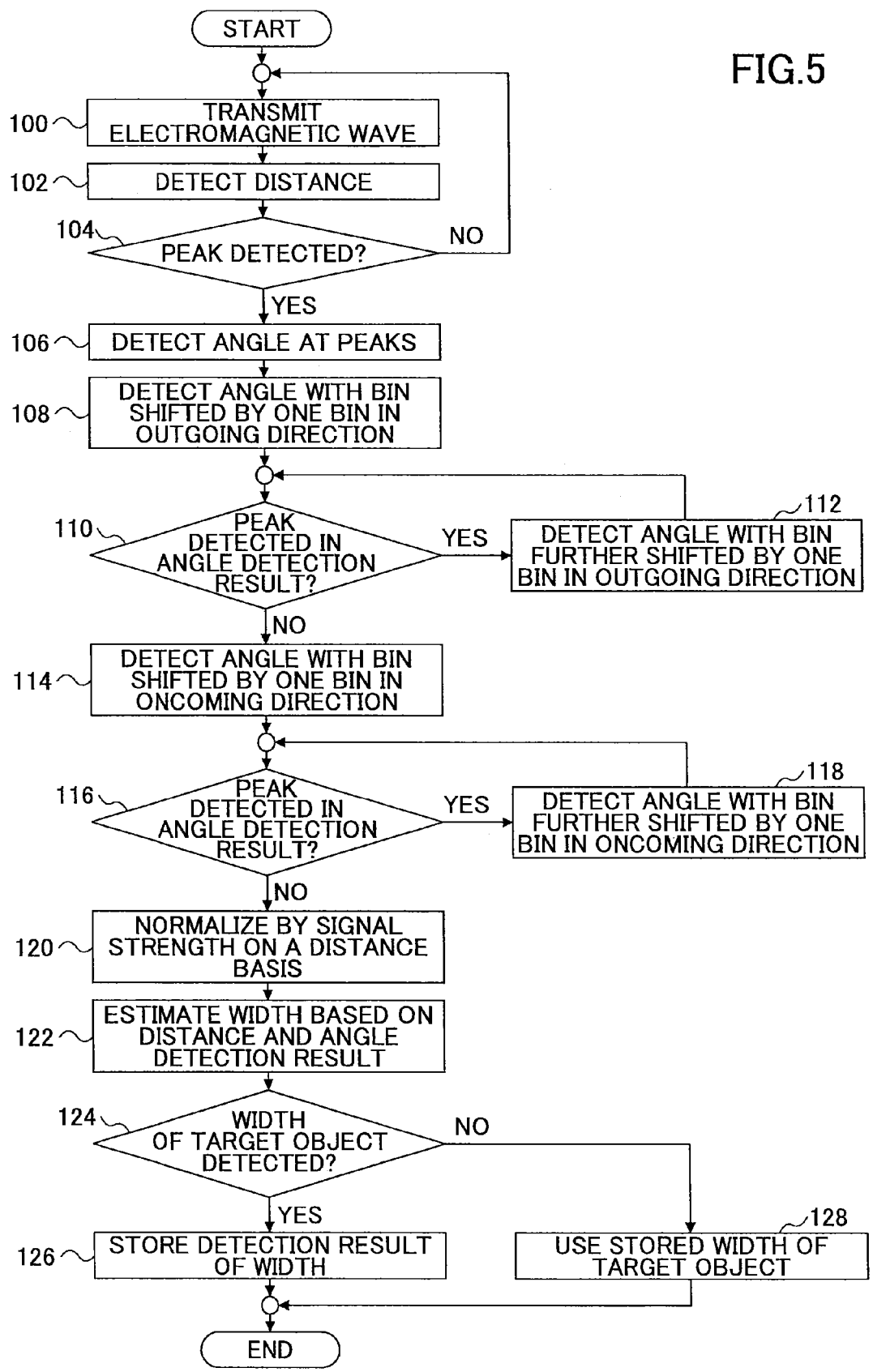
FIG. 5 is a flowchart of an example of a control routine executed by a signal processor in the radar apparatus according to the embodiment.

FIG. 2 is a diagram for illustrating the reception result of the reception antenna 24 (the reception signal strength with respect to the distance bin) in the case where the target object exists a predetermined distance L away from the host vehicle. FIG. 3 is a diagram for explaining a way of detecting a direction of the target object based on the reception results of plural channels (the reception antennas 24-1 through 24-N). FIG. 4 is a diagram for explaining a way of detecting a direction of the target object based on the reception results of the respective channels (the reception antennas 24-1 through 24-N) with respect to plural distance bins including an existence distance bin in the radar apparatus 20 according to the embodiment. Further, FIG. 5 is a flowchart of an example of a control routine executed by the signal processor 32 in the radar apparatus 20 according to the embodiment.

In the embodiment, once the radar apparatus 20 is started up, during the operation of the radar apparatus 20, the oscillation signal is output from the oscillator 26, the transmission wave is emitted to the outside space from the transmission antenna 22, and the reception processes at the reception antennas 24-1 through 24-N are performed (step 100).

If the target subject does not exist in the emission region of the transmission wave, the transmission wave transmitted from the transmission antenna 22 is not reflected on the target subject, and thus the reflected wave of the transmission wave is not received by the reception antennas 24-1 through 24-N. In this case, the strengths of the reception waves received by the reception antennas 24-1 through 24-N are small. On the other hand, if the target subject exists in the emission region of the transmission wave, the transmission wave transmitted from the transmission antenna 30 is reflected on the target subject, and thus the reflected wave of the transmission wave is received by the reception antennas 24-1 through 24-N. In this case, the strengths of the reception waves received by the reception antennas 24-1 through 24-N becomes relatively great (see FIG. 2). When the reflected wave of the transmission wave is received by the reception antennas 24-1 through 24-N, the reception waves thereof are supplied to the mixers 28-1 through 28-N after having been amplified by the amplifiers 36-1 through 36-N. Further, the oscillation signal which varies with time is input to the mixers 28-1 through 28-N from the oscillator 26.

The mixers 28-1 through 28-N mix the corresponding reception signals from the reception antennas 24-1 through 24-N and the oscillation signal from the oscillator 26 to generate the beat signals, respectively. The frequency of the beat signal indicates the distance from the host vehicle to the target object, and the level of the beat signal indicates the strength of the reception reflected wave. The beat signals generated by the mixers 28-1 through 28-N are digitized by the A/D converters 30-1 through 30-N and then supplied to the signal processor 32.

The signal processor 32 performs the FFT processing on the digital signals supplied from the A/D converters 30-1 through 30-N, respectively, to calculate the signal strengths on a frequency basis of the beat signal. Then, the frequency of the beat signal at which the signal strength becomes its peak (the maximum value) is extracted. The frequency of the beat signal at which the signal strength becomes its peak indicates the distance from the host vehicle to the target object. The signal processor 32 performs a distance detecting process of detecting the distance L from host vehicle to the target object based on the frequency of the beat signal at which the signal strength becomes its peak (step 102). It is noted that the frequencies of the beat signal exist with the spacing corresponding to the frequency shifted amount of the oscillation signal output by the oscillator 26, and thus detected distance to the target object has a range to some degree (distance bin).

The signal processor 32 determines whether there is the frequency of the beat signal at which the signal strength becomes its peak, that is to say, whether the peak of the signal strength occurs at the frequency of the beat signal, on a beat signal basis (step 104). It is noted that the determination result may be affirmative if one or more peaks of the signal strength occurs at the frequencies of the beat signal and there is no other peak in a predetermined range from the frequency of the maximum peak.

As the result of the determination, if it is determined that there is no peak, the process routine returns to perform the process of step 100, determining that there is no target subject in the detection region. On the other hand, if it is determined that there is a peak, it is estimated that the target object exists in a distance bin (referred to as "an existence distance bin L" hereinafter) corresponding to the frequency of the beat signal at which the signal strength becomes its peak; and then, at first, a process (direction detecting process) of detecting a direction (angle) α of the target object with respect to the host vehicle is performed with respect to the frequency of the beat signal at which the signal strength becomes its peak, that is to say, with respect to the existence distance bin L in which the target object is estimated to exist (step 106).

Specifically, the signal processor 32 performs the direction detecting process of the target object at the existence distance bin such that at first the signal processor 32 acquires amplitudes and phases in the respective channels (reception antennas 24-1 through 24-N) with respect to the existence distance bin L in which the frequency of the beat signal at which the signal strength becomes its peak appears, among all the distance bins within the detection region. Then, the signal processor 32 detects, based on the acquired amplitudes and phases in the respective channels, the direction α in which the target object exists with respect to the host vehicle with an approach direction estimating process such as digital beam forming, for example.

When the peak of the signal strength occurs at the frequency of the beat signal as described above, the signal processor 32 estimates that there is the target object in the existence distance bin L corresponding to the frequency of the beat signal. Further, when the direction α in which the target object exists is detected by the approach direction estimating process, the signal processor 32 determines that there is the target object away from the host vehicle by the distance corresponding to the existence distance bin L in the detected direction α.

If the signal processor 32 detects the direction α of the target object at the existence distance bin L as described above, then the signal processor 32 performs the direction detecting process of detecting the direction α+1 of the target object with respect to the host vehicle with respect to an adjacent distance bin among all the distance bins within the detection region (step 108). The adjacent distance bin is an adjacent distance bin (L+1) which is next to the existence distance bin L in the direction (outgoing direction) away from the host vehicle or an adjacent distance bin (L+x) which is away from the existence distance bin L by a predetermined number of bins x in the outgoing direction. The direction detecting process of detecting the direction α+1 is performed assuming that the same target object or the continuous target object with respect to the target object detected in the existence distance bin L exists in the adjacent distance bin.

Specifically, the signal processor 32 performs the direction detecting process of the target object in step 108 such that at first the signal processor 32 acquires the amplitudes and the phases in the respective channels (reception antennas 24-1 through 24-N) with respect to the adjacent distance bin (L+1) or (L+x) which is away from the existence distance bin L in the outgoing direction among all the distance bins within the detection region. Then, the signal processor 32 performs the approach direction estimating process based on the acquired amplitudes and the phases in the respective channels to determine whether there is a peak of the signal strength (step 110).

As a result of the approach direction estimating process, if the signal processor 32 determines that there is a peak of the signal strength, then the signal processor 32 further performs the direction detecting process of detecting the direction α+2 of the target object with respect to the host vehicle with respect to an additional adjacent distance bin among all the distance bins within the detection region (step 112). The additional adjacent distance bin is an adjacent distance bin (L+2) which is next to the adjacent distance bin (L+1) in the outgoing direction away from the host vehicle or an adjacent distance bin (L+2x) which is away from the adjacent distance bin (L+1) by a predetermined number of bins x in the outgoing direction. The direction detecting process of detecting the direction α+2 is performed assuming that the same target object or the continuous target object with respect to the target object detected in the existence distance bin L exists in the adjacent distance bin. If the process of step 112 is completed, then the same process as the process of step 110 is performed.

It is noted that the direction detecting process with respect to the adjacent distance bin(s) other than the existence distance bin L is continued by shifting the distance bin to be processed one by one in the outgoing direction until it is determined as a result of the approach direction estimating process that there is no peak of the signal strength. For this reason, in the processes of steps 110 and 112, the adjacent distance bin to be processed is shifted one by one in the outgoing direction until reaching the distance bin at which it is determined as a result of the approach direction estimating process that there is no peak of the signal strength.

As a result of the direction detecting process of step 110, if the signal processor 32 determines that there is no peak of the signal strength with respect to the adjacent distance bin except for the existence distance bin L as a result of the approach direction estimating process, then the signal processor 32 performs the direction detecting process of detecting the direction α−1 of the target object with respect to the host vehicle with respect to an adjacent distance bin among all the distance bins within the detection region (step 114). The adjacent distance bin is an adjacent distance bin (L−1) which is next to the existence distance bin L in the direction (oncoming direction) closer to the host vehicle or an adjacent distance bin (L−x) which is away from the existence distance bin L by a predetermined number of bins x in the oncoming direction. The direction detecting process of detecting the direction α−1 of the target object with respect to the host vehicle is performed assuming that the same target object or the continuous target object with respect to the target object detected in the existence distance bin L exists in the adjacent distance bin.

Specifically, the signal processor 32 performs the direction detecting process of the target object in step 114 such that at first the signal processor 32 acquires the amplitudes and the phases in the respective channels (reception antennas 24-1 through 24-N) with respect to the adjacent distance bin (L−1) or (L−x) which is away from the existence distance bin L in the oncoming direction among all the distance bins within the detection region. Then, the signal processor 32 performs the approach direction estimating process based on the acquired amplitudes and the phases in the respective channels to determine whether there is a peak of the signal strength (step 116). It is noted that the determination result may be affirmative if there are more than one peak of the signal strength as the result of the approach direction estimating process.

As a result of the approach direction estimating process, If the signal processor 32 determines that there is a peak of the signal strength, then the signal processor 32 further performs the direction detecting process of detecting the direction α−2 of the target object with respect to the host vehicle with respect to an additional adjacent distance bin among all the distance bins within the detection region (step 118). The additional adjacent distance bin is an adjacent distance bin (L−2) which is next to the adjacent distance bin (L−1) in the oncoming direction close to the host vehicle or an adjacent distance bin (L−2x) which is away from the adjacent distance bin (L−1) by a predetermined number of bins x in the oncoming direction. The direction detecting process of detecting the direction α−2 of the target object with respect to the host vehicle is performed assuming that the same target object or the continuous target object with respect to the target object detected in the existence distance bin L exists in the adjacent distance bin. If the process of step 118 is completed, then the same process as the process of step 116 is performed.

It is noted that the direction detecting process with respect to the adjacent distance bin(s) other than the existence distance bin L is continued by shifting the distance bin to be processed one by one in the oncoming direction until it is determined as a result of the approach direction estimating process that there is no peak of the signal strength. For this reason, in the processes of steps 116 and 118, the adjacent distance bin to be processed is shifted one by one in the oncoming direction until reaching the distance bin at which it is determined as a result of the oncoming direction estimating process that there is no peak of the signal strength.

As a result of the direction detecting process of step 116, if the signal processor 32 determines that there is no peak of the signal strength with respect to the adjacent distance bin except for the existence distance bin L as a result of the approach direction estimating process, then the signal processor 32 performs a process of normalizing the signal strength of the peak with respect to all the adjacent distance bins and the existence distance bin (step 120). Specifically, the signal strengths at the distance bins are made "1" based on the respective calculation results of the signal strengths of the distance bins (frequencies of the beat signals), and the signal strengths of the peaks in the channels, which are used for the respective direction detecting processes with respect to the distance bins, are normalized.

The magnitudes of the peaks of the signal strengths in the respective direction detecting processes with respect to the distance bins may be different due to the difference in the reflection strength between the respective reflection points of the target object. However, according to the normalization, it is not necessary to vary a threshold for the peak of the signal strength between the direction detecting processes with respect to the distance bins, and the peak of the signal strength can be easily extracted even if the reflected strength of the radio wave from the reflection point of the target object is low.

If the signal processor 32 determines that there is the peak of the signal strength as a result of the approach direction estimating process of step 110, the signal processor 32 detects the directions of the peaks of the signal strengths as the directions $\alpha+1, \ldots$ of the object with respect to the host vehicle. Further, if the signal processor 32 determines that there is the peak of the signal strength as a result of the approach direction estimating process of step 116, the signal processor 32 detects the directions of the peaks of the signal strengths as the directions $\alpha-1, \ldots$ of the object with respect to the host vehicle.

If the signal processor 32 completes the process of the normalization of the peaks of the signal strengths in step 120, then the signal processor 32 performs a process of detecting an area in which the target object exists based on the result of the distance detecting process and the result of the direction detecting process (step 122). By detecting the distance L from the host vehicle to the target object (existence distance bin L) with the distance detecting process based on the frequency of the beat signal at which the signal strength becomes its peak, and detecting the directions $\alpha, \ldots$ of the object with respect to the host vehicle with the direction detecting process based on the peaks of the signal strengths as a result of the approach direction estimating process with respect to the existence distance bin L and the distance bins near the existence distance bin L, the area in which the target object exists is detected. When the area in which the target object exists with respect to the host vehicle is detected, it is possible to detect the size or the width of the target object.

When the signal processor 32 performs the process of step 122, then the signal processor 32 determines whether the size or the width of the target object can be detected (step 124). It is noted that if there is no difference between the distances to the points in the area in which the target object exists, it becomes difficult to detect the area in which the target object exists, and it becomes difficult to detect the size and the width of the target object. If the signal processor 32 determines that the signal processor 32 can detect the size and the width of the target object, the signal processor 32 stores the detected size and the width of the target object in the internal memory, and outputs the data signal according to the recognition result of the target object to the application apparatus (step 126). On the other hand, if the signal processor 32 determines that the signal processor 32 cannot detect the size and the width of the target object, the signal processor 32 reads the size and the width of the target object stored in the internal memory, and outputs the data signal according to the recognition result of the target object to the application apparatus (step 128).

In this way, according to the radar apparatus 20 of the embodiment, the direction $\alpha$ of the target object with respect to the host vehicle is detected with respect to the existence distance bin L which corresponds to the frequency of the beat signal at which the signal strength becomes its peak and in which the target object is estimated to exist, and the directions $\alpha-n, \ldots \alpha-1, \alpha+1, \ldots \alpha+n$ of the target object with respect to the host vehicle are detected with respect to the respective adjacent distance bins extend in the outgoing and oncoming directions from the existence distance bin L until reaching the distance bins in which it is determined that there is no peak of the signal strength.

If the direction of the target object is detected on a distance bin basis, it is possible to detect the area in which the target object exists and it is also possible to detect the size and the width of the target object (the width or the length of the vehicle, in the case of the target object being the vehicle). Thus, according to the radar apparatus 20, it is possible to detect the area in which the target object exists within the detection region in front of the host vehicle and the size and the width of the target object.

It is noted that according to the radar apparatus 20 of the embodiment, since the area in which the target object exists is detected by identifying plural reflection points on the target object defined by the distances and the directions obtained by the distance detecting process and the direction detecting process, the area in which the target object exists can be detected with high accuracy even if the reflected strength of the radio wave differs from one position to another on the reflection surface of the target object.

Further, according to the radar apparatus 20 of the embodiment, the direction detecting process is performed with respect to the existence distance bin L and the adjacent distance bin within the predetermined region in front of the host vehicle, respectively. If the target object is an object whose length is relatively short, such as other vehicles, when the existence distance bin L in which it is determined that target object exists is detected, the distances from the host vehicle to the points on the target object are close to the distance corresponding to the existence distance bin L. Thus, according to the embodiment, since the direction detecting process for determining whether there is a peak of the signal strength as a result of the approach direction estimating process is necessary with respect to not all the distance bins, the calculation process in detecting the area of the target object can be simplified.

Further, according to the radar apparatus 20 of the embodiment, if the size and the width of the target object can be detected, the size and the width of the target object are stored in the internal memory and the data signal according to the recognition result of the target object is output to the application apparatus. On the other hand, if the signal processor 32 cannot detect the size and the width of the target object, the signal processor 32 reads the size and the width of the target object stored in the internal memory, and outputs the data signal according to the recognition result of the target object to the application apparatus. The application apparatus performs the control based on the data signal from the radar apparatus 20.

Thus, according to the embodiment, even if the size and the width of the target object, which has been detected before, cannot be detected at a certain time t, the target object detected at the time t can be recognized as the target object which has the size and the width detected before. Therefore, it is possible to prevent an uncontrollable state of the application apparatus due to the absence of the detection of the size and the width of the target object. For example, it is assumed that the application apparatus performs the control such that the host vehicle travels to follow the preceding vehicle. In this case, even if the existence area of the preceding vehicle cannot be detected by the radar apparatus 20 of the host vehicle due to the fact that the preceding vehicle is at the same distance as the oncoming vehicle traveling in the adjacent lane with respect to the host vehicle, it is possible to continue the control for following the preceding vehicle with the application apparatus of the host vehicle.

It is noted that according to the first embodiment, the transmission antenna 22 corresponds to "transmitting part" recited in claims, and the reception antenna 24 corresponds to "receiving parts" recited in claims. Further, "a distance detecting part" recited in claims is implemented by the signal processor 32 performing the process of step 102 in the process routine illustrated in FIG. 5, "a direction detecting process executing part" recited in claims is implemented by the signal processor 32 performing the process of steps 108, 112, 114 and 118, "a existence area detecting part" recited in claims is implemented by the signal processor 32 performing the process of step 122, and "an angle detecting part" recited in claims is implemented by the signal processor 32 performing the process of step 106.

Second Embodiment

In the first embodiment, if there is the frequency of the beat signal at which the signal strength becomes its peak, that is to say, if the peak of the signal strength occurs at the frequency of the beat signal, the direction detecting process is performed with respect to the predetermined distance bin including the existence distance bin. In contrast, according to the second embodiment of the present invention, if there is not the frequency of the beat signal at which the signal strength becomes its peak, that is to say, if the peak of the signal strength does not occur at the frequency of the beat signal, the direction detecting process is performed with respect to the predetermined distance bin. This is because if the target object is an on-road object (a continuous on-road object) which exits in a spatially continued and seamless manner) such as a wall, a curb or the like, there may be a case where the peak of the signal strength does not occur at the frequency of the beat signal or the peak is not stable even if it occurs. The embodiment enables the detection of such an on-road object.

Figure 6:
FIG. 6 is a diagram for illustrating the reception result of a reception antenna (the reception signal strength with respect to the distance bin) in the case where a wall exists near the host vehicle.
Figure 7:
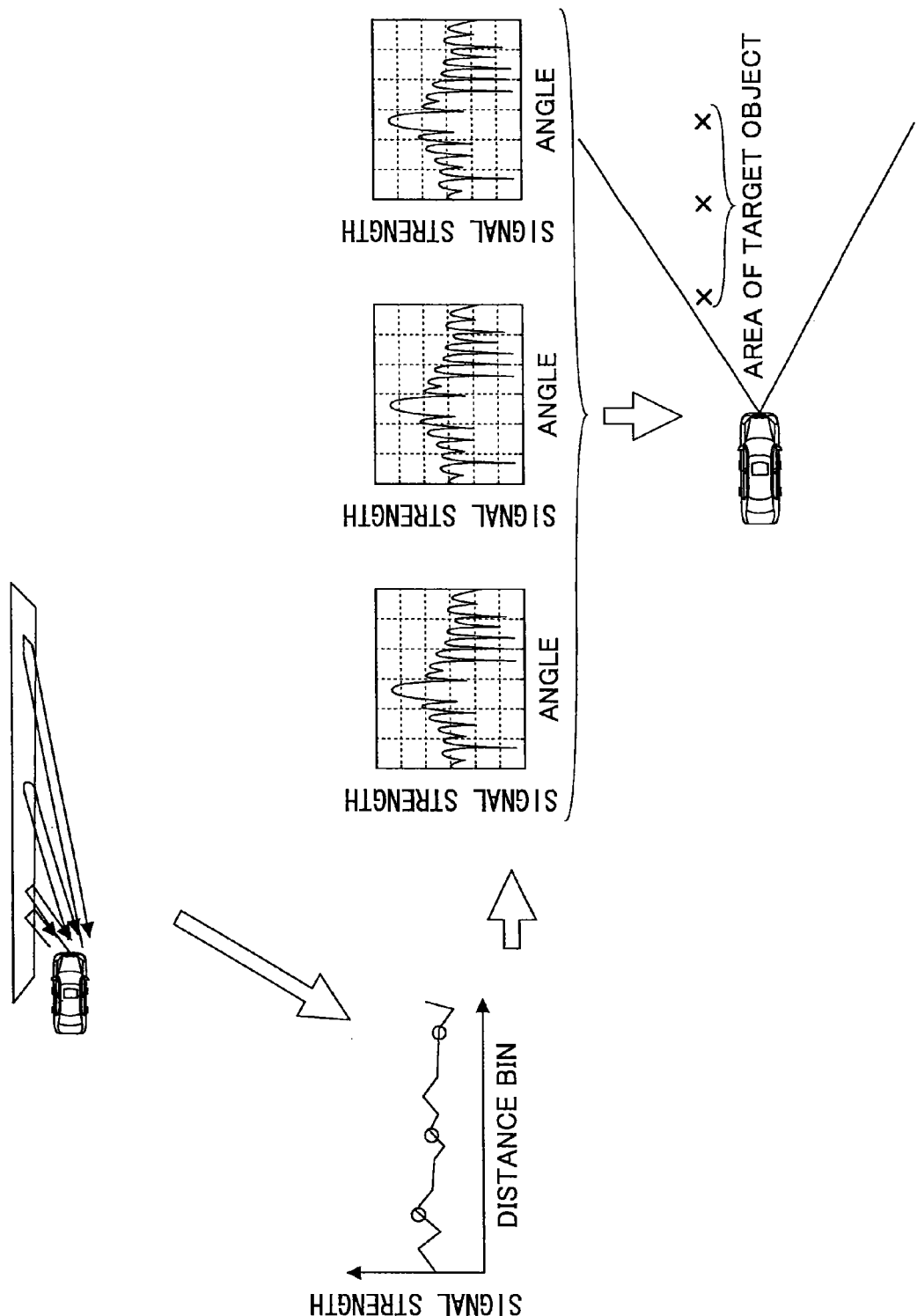
FIG. 7 is a diagram for explaining a way of detecting a direction of the target object based on the reception results of the respective reception antennas with respect to respective distance bins in the radar apparatus according to a second embodiment of the present invention.
Figure 8:
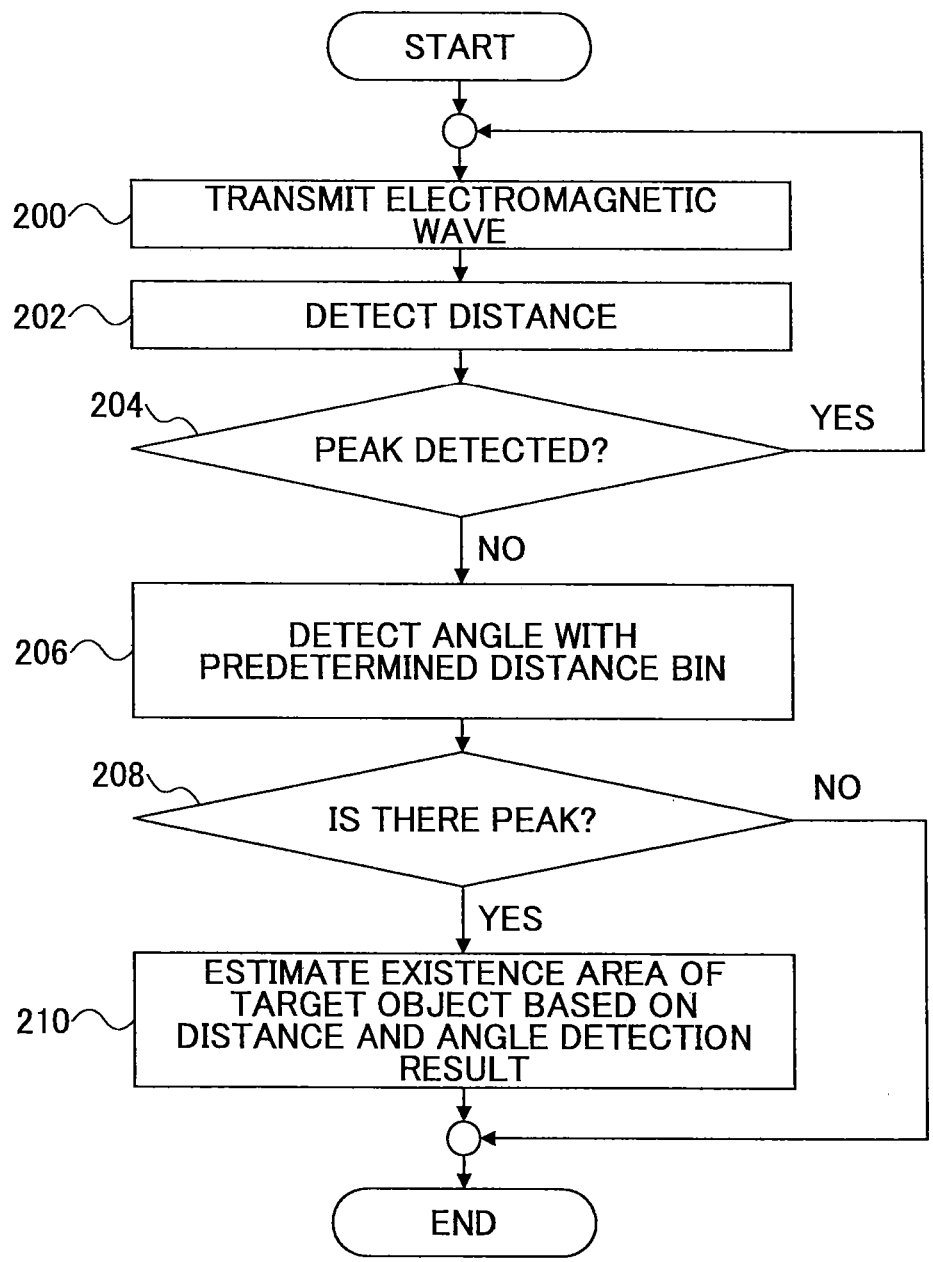
FIG. 8 is a flowchart of an example of a control routine executed by a signal processor in the radar apparatus according to the embodiment.

FIG. 6 is a diagram for illustrating the reception result of the reception antenna 24 (the reception signal strength with respect to the distance bin) in the case where a wall exists near the host vehicle. FIG. 7 is a diagram for explaining a way of detecting a direction of the target object based on the reception results of the respective channels (the reception antennas 24-1 through 24-N) with respect to plural distance bins in the radar apparatus 100 according to the embodiment. Further, FIG. 8 is a flowchart of an example of a control routine executed by the signal processor 102 in the radar apparatus 100 according to the embodiment. It is noted that the radar apparatus 100 according to the embodiment is implemented by using the signal processor 102 instead of the signal processor 30 in the radar apparatus 20 according to the first embodiment described above.

In the embodiment, once the radar apparatus 100 is started up, during the operation of the radar apparatus 100, the oscillation signal is output from the oscillator 26, the transmission waves are emitted to the outside space from the transmission antenna 22, and the reception processes at the reception antennas 24-1 through 24-N are performed (step 200).

If the target subject does not exist in the emission region of the transmission wave, the transmission wave transmitted from the transmission antenna 22 is not reflected on the target subject, and thus the reflected wave of the transmission wave is not received by the reception antennas 24-1 through 24-N. In this case, the strengths of the reception waves received by the reception antennas 24-1 through 24-N are low. Further, when the target subject exists in the emission region of the transmission wave but the target subject is the continuous on-road object such as a wall, the reflected wave of the transmission wave reflected on the target object is received by the reception antennas 24-1 through 24-N; however, the strengths of the reception waves at the respective reception antennas 24-1 through 24-N are relatively great but do not have significant peaks. When the reflected wave of the transmission wave is received by the reception antennas 24-1 through 24-N, the reception waves thereof are supplied to the mixers 28-1 through 28-N after having been amplified by the amplifiers 36-1 through 36-N. Further, the oscillation signal which varies with time is input to the mixers 28-1 through 28-N from the oscillator 26.

The mixers 28-1 through 28-N mix the corresponding reception signals from the reception antennas 24-1 through 24-N and the oscillation signal from the oscillator 26 to generate the beat signals, respectively. The frequency of the beat signal indicates the distance from the host vehicle to the target object, and the level of the beat signal indicates the strength of the reception reflected wave. The beat signals generated by the mixers 28-1 through 28-N are digitized by the A/D converters 30-1 through 30-N and then supplied to the signal processor 102.

The signal processor 102 performs the FFT processing on the digital signals supplied from the A/D converters 30-1 through 30-N, respectively, to calculate the signal strengths on a frequency basis of the beat signal. Then, the frequency of the beat signal at which the signal strength becomes its peak (the maximum value) is extracted. The frequency of the beat signal at which the signal strength becomes its peak indicates the distance from the host vehicle to the target object. The signal processor 102 performs a distance detecting process of detecting the distance L from host vehicle to the target object based on the frequency of the beat signal at which the signal strength becomes its peak (step 202). It is noted that the frequencies of the beat signal exist with the spacing corresponding to the frequency shifted amount of the oscillation signal output by the oscillator 26, and thus detected distance to the target object has a range to some degree (distance bin).

The signal processor 102 determines whether there is the frequency of the beat signal at which the signal strength becomes its peak, that is to say, whether the peak of the signal strength occurs at the frequency of the beat signal, on a beat signal basis (step 204). It is noted that the determination result may be affirmative if one or more peaks of the signal strength occurs at the frequencies of the beat signal and there is no other peak in a predetermined range from the frequency of the maximum peak.

As the result of the determination, if it is determined that there is the peak, the process routine returns to perform the process of step 100, determining that there is the target subject in the detection region. It is noted that if such a determination is made, the processes described with reference to the first embodiment may be performed. On the other hand, if it is determined that there is no peak, then the signal processor 102 performs the direction detecting process of detecting the direction (angle) of the target object with respect to the host vehicle with respect to a predetermined distance bin among all the distance bins within the detection region. It is noted that the direction detecting process is performed, respectively, for more than two distance bins among all the distance bins within the detection region.

Specifically, the signal processor 102 acquires the amplitudes and the phases in the respective channels (reception antennas 24-1 through 24-N) with respect to the predetermined bins, respectively. Then, the signal processor 102 performs the approach direction estimating process such as a digital beam forming, for example, based on the acquired amplitudes and the phases in the respective channels to determine whether there is a peak of the signal strength, on a predetermined bin basis (step 208).

If it is determined there is no peak of the signal strength as a result of the approach direction estimating process with respect to all the predetermined bins, the process routine ends without performing any particular subsequent process. On the other hand, if it is determined that there is a peak of the signal strength as a result of the approach direction estimating process with respect to at least one of the predetermined bins, the signal processor 102 recognizes that the target object exists at the position corresponding to the direction of the peak of the signal strength with respect to the host vehicle.

In this way, according to the radar apparatus 100 of the embodiment, even if there is no peak of the signal strength at the frequency of the beat signal with respect to the reception wave received by the reception antenna 24 and thus it is determined that there is no existence distance bin L in which the target object is estimated to exist, it is determined whether there is a peak of the signal strength as a result of the approach direction estimating process with respect to the predetermined distance bins. If it is determined that there is a peak of the signal strength as a result of the approach direction estimating process with respect to the respective predetermined distance bins, the area in which the target object exists can be estimated based on the positions of the portions of the target object defined by the distances and the directions. Therefore, according to the radar apparatus 100 of the embodiment, even with respect to the target object (the continuous on-road object) for which there is no frequency of the beat signal detected by the distance detecting process at which the signal strength becomes its peak, the area in which the target object exists can be detected within the detection region in front of the host vehicle.

It is noted that according to the radar apparatus 100 of the embodiment, since the area in which the target object exists is detected by identifying plural reflection points of the target object defined by the distances corresponding to the predetermined distance bins and the directions detected by the direction detecting process, the area in which the target object exists can be detected with high accuracy.

It is noted that according to the second embodiment, "a distance detecting part" recited in claims is implemented by the signal processor 102 performing the process of step 202 in the process routine illustrated in FIG. 8, "a direction detecting process executing part" recited in claims is implemented by the signal processor 102 performing the process of steps 206, and "a existence area detecting part" recited in claims is implemented by the signal processor 102 performing the process of step 210.

It is noted that in the first and second embodiments, the radar apparatuses 20 and 100 are of FM-CW type; however, the present invention is not limited to this type, and can be applied to a pulse radar apparatus, an AM radar apparatus, a laser radar apparatus, etc.

Further, in the first and second embodiments, the detection of the direction of the target object with respect to the host vehicle is implemented by utilizing the approach direction estimating process such as digital beam forming, for example; however, a phase comparison monopulse type may be utilized which detects the phase difference between the reception signals received by the reception antennas 24 which are disposed in different positions with respect to the single transmission wave.

Further, in the first and second embodiments, the number of the transmission antenna 22 is one and plural reception antennas 24 are provided; however, plural transmission antennas 22 may be provided. Further, if there are plural reception antennas 24, the reception circuits may be provided individually for corresponding reception antennas 24; however, a single reception circuit shared with the reception antennas 24 and switches for switching the connection between the parts of the single reception circuit and the reception antennas 24 may be provided. According to such a variant, since the reception circuit is shared with the reception antennas 24, it is possible to simplify the configuration of the radar apparatus.

Further, if there are plural reception antennas 24, the reception antennas 24 may be dedicated to the reception; however, at least one of the reception antennas 24 may be also used as the transmission antenna 22, and a switch may be provided for switching the connection of the reception antenna between the transmission circuit and the reception circuit. According to such a variant, since the transmission antenna and the reception antennas is implemented by the single antenna, it is possible to further simplify the configuration of the radar apparatus.

Further, in the first and second embodiments, the detection region from the host vehicle to the target object to be detected is defined in one dimension, and only one-dimensional scanning is performed in detecting the target object; however, the present invention is not limited to this. For example, the detection region may be defined in two dimensions, that is to say, the left and right directions and the forward and backward directions, and two-dimensional scanning may be performed in detecting the target object. Further, the detection region may be defined in three dimensions, that is to say, the left and right directions, the forward and backward directions and the up and down directions, and three-dimensional scanning may be performed in detecting the target object.

The invention claimed is:

1. A radar apparatus which includes a transmitting part configured to transmit a radio wave and receiving parts configured to receive a reflected wave of the radio wave transmitted from the transmitting part, and detects a target object based on the reflected wave received by the receiving parts, comprising:
   a distance detecting part configured to detect, among plural bins from which relative distances to the target object can be calculated, an existence distance bin in which the target object exists, the plural bins corresponding to respective frequencies of a beat signal of the reflected wave;
   an angle detecting part configured to detect a direction in which the target object exists, with respect to the existence distance bin detected by the distance detecting part;
   a direction detecting process executing part configured to execute the process of detecting the direction in which the target object exists, with respect to only an adjacent distance bin located near the existence distance bin, among the bins, if it is determined by the distance detecting part that there is the existence distance bin; and
   an existence area detecting part configured to detect an area in which the target object exists based on positions, one of the positions being based on the existence distance bin detected by the distance detecting part and the direction in which the target object exists detected by the angle detecting part, and another position being based on the adjacent distance bin and the direction in which the target object exists, the direction being detected by an execution of the process by the direction detecting process executing part,
   wherein the distance detecting part determines the existence distance bin when there is a peak of a signal strength of the beat signal of the reflected wave received by the receiving parts that is greater than or equal to a predetermined value, the signal strength being obtained on a per distance bin basis of the plural distance bins.

2. The radar apparatus of claim 1, wherein the angle detecting part detects the area in which the target object exists based on amplitudes and phases obtained in plural channels, with respect to the existence distance bin at which there is the peak of the signal strength of the reflected wave received by the receiving parts.

3. The radar apparatus of claim 2, wherein the angle detecting part detects an angle at which a peak of a signal strength of the reflected wave received by the receiving parts appears, as the direction in which the target object exists, the signal strength being obtained on an angle basis with respect to the existence distance bin.

4. The radar apparatus of claim 1, wherein the direction detecting process executing part executes the process of detecting the direction in which the target object exists, based on amplitudes and phases obtained in plural channels, with respect to respective adjacent distance bins located near the existence distance bin, among the bins, if it is determined by the distance detecting part that there is the existence distance bin.

5. A radar apparatus which includes a transmitting part configured to transmit a radio wave and receiving parts configured to receive a reflected wave of the radio wave transmitted from the transmitting part, and detects a target object based on the reflected wave received by the receiving parts, comprising:
   a distance detecting part configured to detect, among plural bins from which relative distances to the target object can be calculated, an existence distance bin in which the target object exists, the plural bins corresponding to respective frequencies of a beat signal of the reflected wave;
   a direction detecting process executing part configured to execute a process of detecting a direction in which the target object exists, with respect to predetermined distance bins, of the plural bins, if the distance detecting part does not detect a peak of a signal strength of the beat signal; and
   an existence area detecting part configured to detect an area in which the target object exists based on positions, each position being determined on a predetermined distance bin basis based on the corresponding predetermined distance bin and the direction in which the target object exists, the direction being detected by an execution of the process by the direction detecting process executing part with respect to the corresponding predetermined distance bin.

6. The radar apparatus of claim 5, wherein the direction detecting process executing part executes the process of detecting the direction in which the target object exists, based on amplitudes and phases obtained in plural channels, with respect to the predetermined distance bins, of the plural bins, if the distance detecting part does not detect the existence distance bin among the plural bins.

7. The radar apparatus of claim 4, wherein the direction detecting process executing part detects an angle at which the peak of the signal strength of the beat signal of the reflected wave received by the receiving parts appears, as the direction in which the target object exists, the signal strength being obtained on an angle basis with respect to the respective adjacent distance bins.

8. The radar apparatus of claim 6, wherein the direction detecting process executing part detects an angle at which the peak of the signal strength of the beat signal of the reflected wave received by the receiving parts appears, as the direction in which the target object exists, the signal strength being obtained on an angle basis with respect to the respective predetermined distance bins.

* * * * *